July 23, 1935. F. G. FOLBERTH ET AL 2,009,169
BRAKE ACTUATING MECHANISM
Filed Sept. 8, 1931   3 Sheets-Sheet 1

Inventors
FREDERICK G. FOLBERTH &
WILLIAM M. FOLBERTH
By Richey & Watts
Attorneys July 23, 1935. F. G. FOLBERTH ET AL 2,009,169
BRAKE ACTUATING MECHANISM
Filed Sept. 8, 1931 3 Sheets-Sheet 2
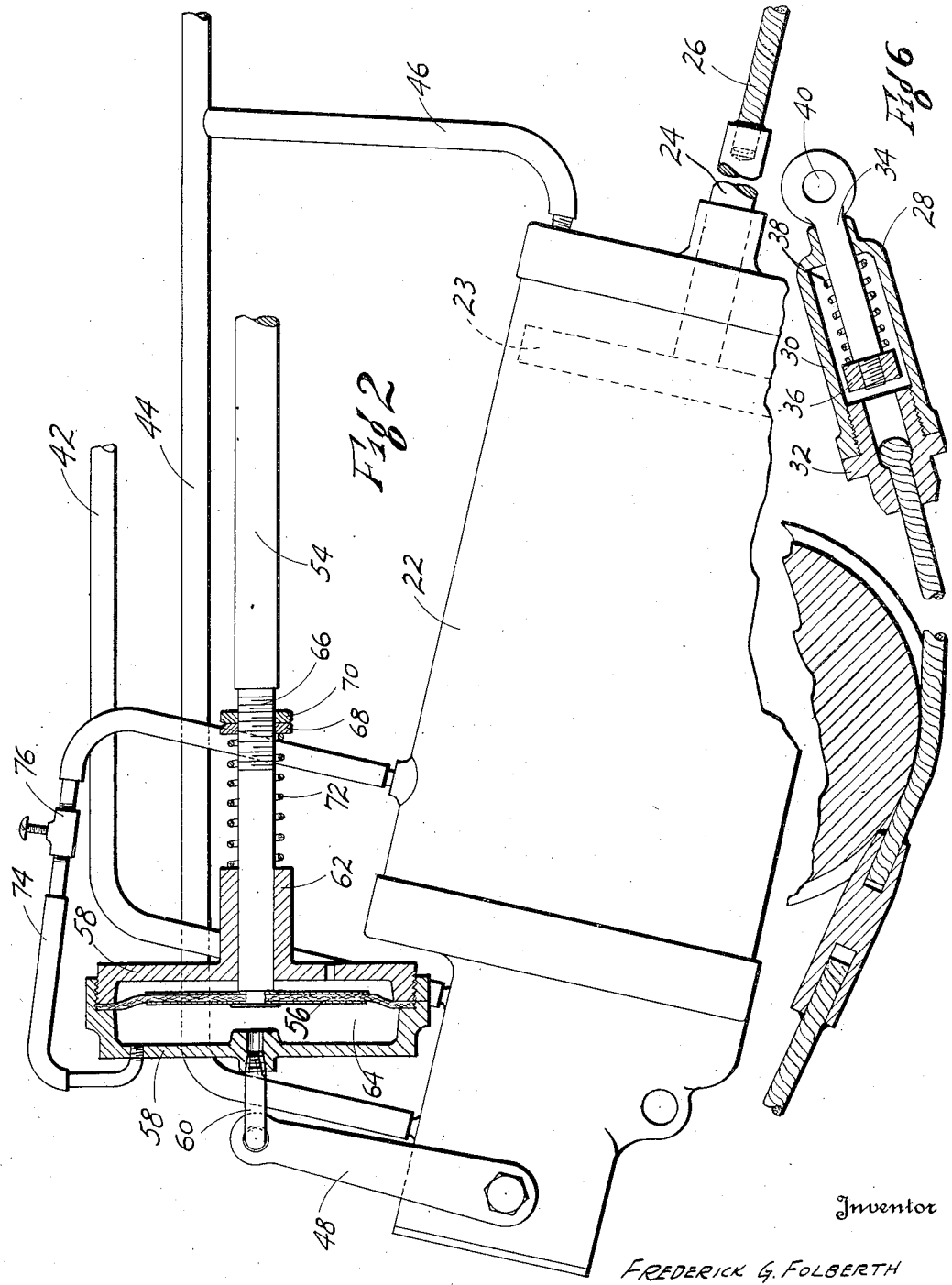
Inventor
FREDERICK G. FOLBERTH
& WILLIAM M. FOLBERTH.
By Richey & Watts
Attorney

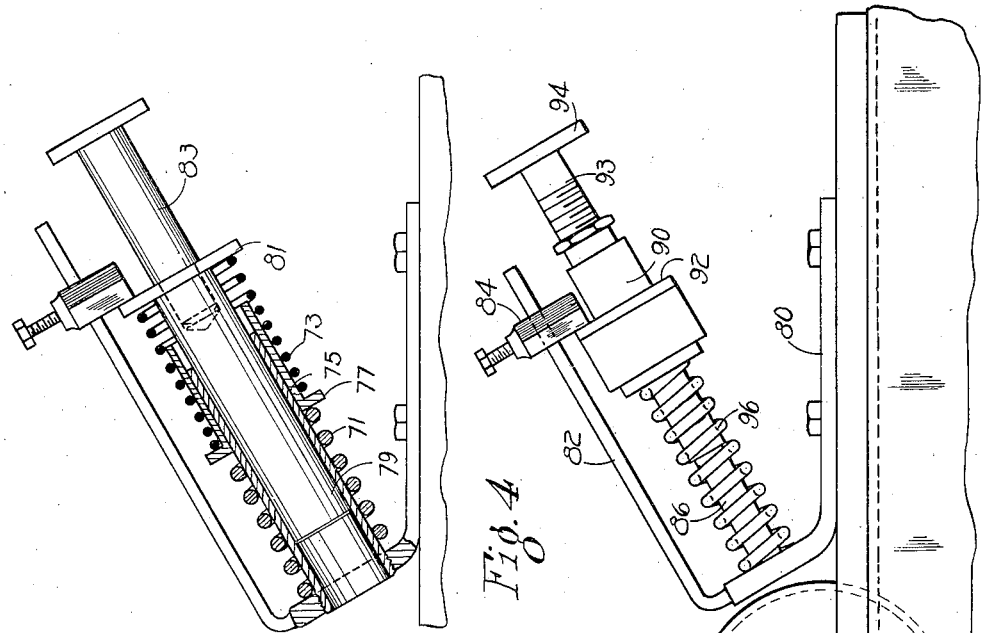
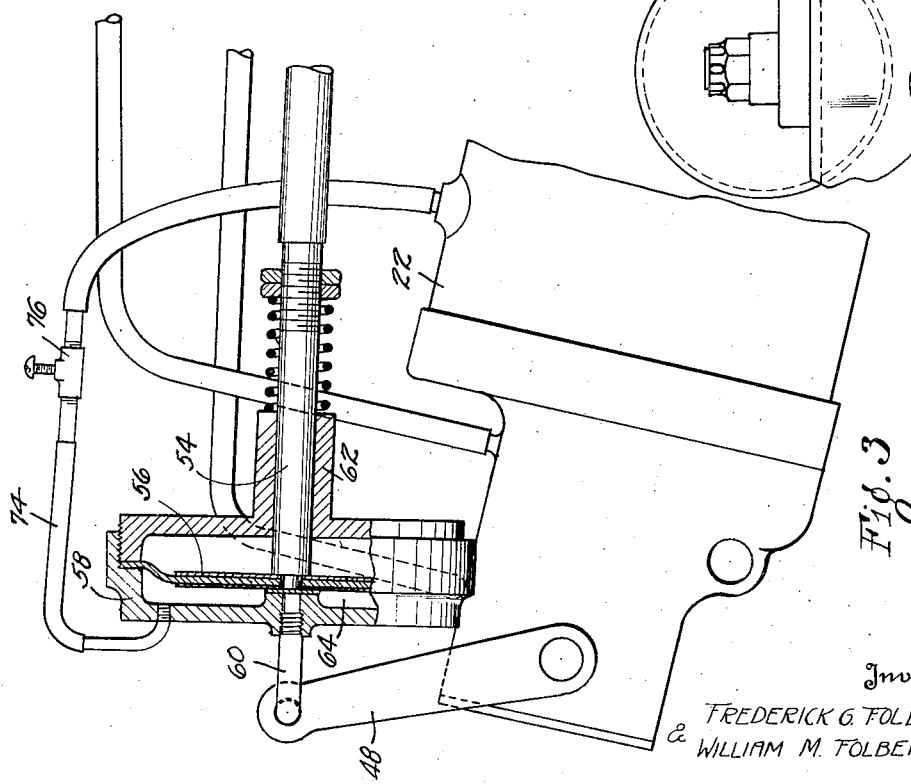

Patented July 23, 1935

2,009,169

UNITED STATES PATENT OFFICE 2,009,169

BRAKE ACTUATING MECHANISM

Frederick G. Folberth and William M. Folberth, Cleveland, Ohio

Application September 8, 1931, Serial No. 561,569

18 Claims. (Cl. 192—13)

The present invention relates to vehicle brakes and more particularly to an apparatus for automatically actuating the brakes of an automotive vehicle with the application of power derived from the engine of the vehicle.

In our copending applications, Serial No. 395,548 filed September 27, 1927, Serial No. 483,328, filed September 20, 1930 and Serial No. 558,304, filed August 20, 1931 for vehicle brakes there is disclosed apparatus for automatically actuating the brakes of a motor vehicle upon depression of one of the control pedals in the driving compartment of the vehicle. In these applications the source of power employed for actuating the brakes is derived from the vacuum created by the engine in the intake manifold and similarly in the invention covered by this application vacuum derived from this source is also employed for actuating the brakes.

The present invention is designed as an improvement over the inventions disclosed in the above mentioned copending applications in that means is provided to effect a rapid clearance take up of the friction element of the brake so as to position the power application mechanism in proper relation to facilitate instantaneous and delicate manipulation and ready control of the brake mechanism.

Other objects and advantages of the invention will become more readily apparent as the nature of the invention is better understood, and the same consists in a novel construction, combination and arrangement of parts shown in the accompanying three sheets of drawings in which:

Fig. 2 is a fragmentary view (certain parts being broken away) of the means by which the power element is utilized to rapidly effect the initial clearance take up of the brake mechanism.

Fig. 3 is a fragmentary view, similar to Fig. 2 showing the same arrangement of parts in their actuated position.

Fig. 4 is a detailed sectional view of a spring loaded plunger employed in connection with the present invention, and Fig. 5 is a side elevation of a slightly modified form of a spring loaded plunger, and Fig. 6 is fragmentary view of a lost motion connection employed by the present invention.

In all of the above described views like characters of reference are employed to designate like parts throughout the specification.

Figure 1:
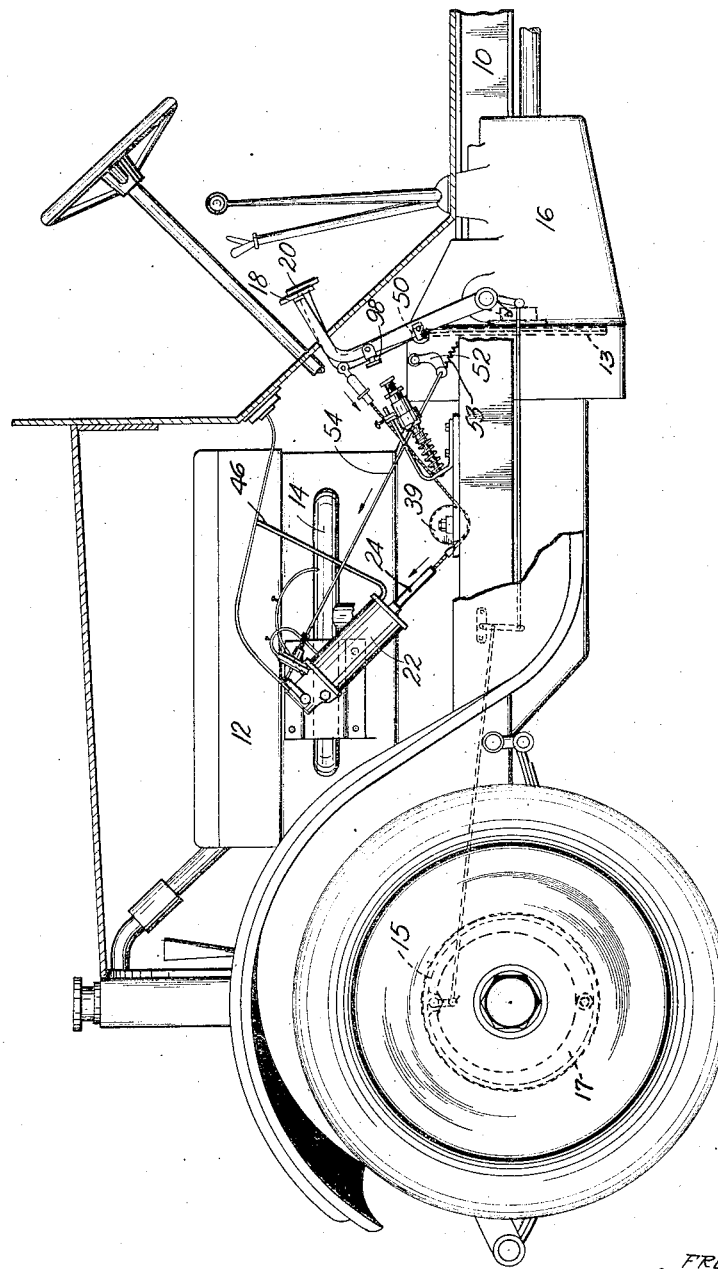
Fig. 1 is a side elevation of an automotive vehicle equipped with the novel braking device which comprises the present invention, certain parts being broken away to more clearly reveal the nature of the present invention.

Referring now to Fig. 1 an automotive vehicle is designated in its entirety at 10. This vehicle is provided with an engine 12 having the usual intake manifold 14 and having a transmission 16. The usual clutch and brake pedals are provided and these pedals are designated at 18 and 20 respectively. The vehicle clutch is diagrammatically shown at 13 and may be of any suitable type. Movement of the brake pedal forwardly and downwardly in the usual manner will serve to apply the ordinary friction type brake mechanism which includes a brake drum 15 carried on the wheels of the vehicle and suitable brake shoes 17 adapted to be moved into frictional engagement with the drum to secure the desired braking effect. Similarly actuation of the clutch lever 18 will serve to disengage the usual clutch mechanism to permit the driving wheels of the vehicle to become disengaged from the motive power elements. Movement of the clutch pedal 18 to an extreme operative position will also serve to actuate the brake pedal 20 with the application of power derived from the vacuum created in the intake manifold of the engine 12 in a manner and by an apparatus that will be more fully described hereinafter. As shown secured to the engine is a cylinder 22 having a piston 23 slidably mounted therein. The piston carries a piston rod 24 which extends through one end of the cylinder 22. This piston rod 24 is connected through a lost motion connection in the form of a cable 26 to the brake lever 20. Interposed in the lost motion connection is a spring loaded link member 28. This member consists in a casing 30 having a removable plug 32 threaded into one end thereof. Extending into the plug 32 is one end of the cable 26. This end is enlarged in any suitable manner as for example by splicing to prevent removal of the same from the plug 32. Extending through one end of the casing 30 is a slidable rod 34 having a nut 36 secured thereto at its inner end. Disposed between this nut and the end of the casing through which the rod 34 projects is a compression spring 38. Secured in any suitable manner to a stationary part of the vehicle is a pulley 39 underneath which the lost motion cable 26 passes. The rod 34 is provided with a head 40 which is adapted to be attached to the brake pedal in the manner shown in Fig. 1. It will be seen therefore that movement of the piston in the cylinder 22 in one direction will serve to automatically, and with the application of power, depress the brake lever 20 through the medium of the lost motion connection cable which passes underneath the pulley 39.

In order that the piston in the cylinder 22 may be actuated, the cylinder 22 is connected to the intake manifold 14 of the automobile engine by means of a conduit 42. Another connection in the form of a pipe 44 communicates the interior of the cylinder with atmosphere through an air filter (not shown). A third connection in the form of a pipe 46 also communicates the cylinder 22 with the atmosphere by joining the pipe 44. Thus it will be seen that opposite ends of the cylinder 22 may communicate with atmosphere under certain conditions of operation. The cylinder 22 is provided with a valve (not shown) for controlling the bleeding of fluid pressure from the cylinder 22. This valve is controlled by means of a lever 48 which is pivotally supported on the casing of the cylinder 22. This valve may be identical with the valve and cylinder instrumentalities disclosed in our United States Patent No. 1,966,621 which issued on July 17, 1934 for a Theft prevention device for vehicles and it is thought that a complete disclosure of the instrumentalities shown in our copending application just referred to need not be made in this application. The control valve structure per se does not form a part of the present invention and any suitable valve which will properly control the flow of actuating fluid to and from the brake operating cylinder may be used. It will therefore suffice to say that movement of the lever 48 in one direction will open the valve above referred to to admit communication between the cylinder and the intake manifold to move the piston 23 by the creation of a partial vacuum in the cylinder. Movement of the lever 48 throughout any increment of its path of travel will open the valve which controls the communication between the cylinder 22 and the intake manifold 14 a proportionate amount until, in one extreme position when the lever 48 is moved throughout its entire stroke, the valve will be wide open and the cylinder 22 will have full communication with the manifold so that a vacuum will be created in the cylinder causing the piston 23 to move inwardly of the cylinder and produce a maximum braking effect. Movement of the piston inwardly will serve to depress the brake pedal 20 by virtue of the lost motion connection 26 secured to these members as previously described.

Secured to the clutch pedal 18 at a point intermediate its ends is a roller 50, which roller is adapted to contact with a cam link 52 pivoted to the transmission casing 16 or otherwise suitably maintained. This cam link 52 has secured to its free end a thrust rod 54. The thrust rod 54 has its other end secured to a diaphragm 56 in a diaphragm chamber 64 the casing 58 of which is secured by means of a short rod 60 to the free end of the lever 48. The rod 54 extends into the casing 58 through a sleeve 62 integrally formed on the same. The casing is formed in two parts, the part carrying the sleeve 62 being threadedly receivable in the other part which is connected to the lever 48 by means of the rod 60. The diaphragm 56 divides the chamber into two parts and the periphery of this diaphragm is clamped between the two sections. The rod 54 is provided with a threaded portion 66 having thereon a bearing nut 68 and a lock nut 70. Interposed between the end of the sleeve 62 and the bearing nut 68 and surrounding the rod 64 is a coil spring 72 by means of which spring the diaphragm 56 is normally urged rearwardly, or in other words, in the direction of the sleeve 62. The diaphragm chamber 64 communicates with the interior of cylinder 22 through a conduit 74. This conduit is connected to the forward side 64 of the diaphragm chamber and to the cylinder 22 adjacent the valve mechanism. A throttle valve 76 is interposed in the conduit 74 for a purpose to be more fully described hereafter.

Referring now to Figures 1 and 5 a bracket 80 is mounted on the chassis frame. This bracket is provided with an arm 82 having a stop 84 adjustably mounted thereon. Projecting from the lower portion of the bracket 80 is a stem 86 having a sleeve 90 slidable thereon. The sleeve 90 carries a head 92 adapted to abut the stop 84. Within the sleeve 90 there is threaded a contact element 93 having a head 94 formed thereon. A coil spring 96 is disposed between this head and the bracket 80 to normally urge the same against the stop 84. Secured to the clutch pedal 18 is a contact member 98 which registers with the contact head 94 of the contact member 93 so that upon depression of the clutch lever 18 these two contact elements come into engagement so that the operator may feel the resistance of the spring 96 and be informed thereby that the clutch is fully disengaged and that the initial clearance take up of the brake mechanism has been effected and that the immediate power control of the brake is at command. In Fig. 4 there is a slightly modified form of the spring loaded plunger shown in Fig. 5. In this form of the invention a compounding spring action is effected by means of two coil springs 71 and 73, instead of the coil spring 96. The head construction 99 disclosed in Fig. 5 is slightly modified in that a sleeve 75 having a flange 77 is disposed about a central supporting member 79. The coil spring 73 which is of lesser strength than the coiled spring 71 is disposed about this sleeve and bears against the flange 77 and a collar 81 carried by a contact element 83. The operation of the spring loaded plunger in this figure is generally similar in its operation to that shown in Figure 5. When the contact member 98 on the clutch pedal engages the end of the plunger contact element 83 the first action is to compress the relatively light spring 73. This offers a relatively small additional resistance to movement of the clutch pedal. However when the collar 81 of the contact element 83 strikes the upper end of the sleeve 75 the downward movement of the clutch pedal is then opposed by the relatively strong spring 71. The parts are preferably adjusted so that this relatively strong spring 71 becomes effective to oppose the downward movement of the clutch pedal when the slack take-up operation has been completed and the brakes are in condition to be instantaneously applied upon further downward movement of the clutch pedal.

In the operation of the vehicle, the brake pedal 20 is connected in the usual manner to the braking system and the clutch pedal 18 may similarly be connected to control the action of the clutch in the usual manner. In operating the vehicle the brakes may be applied by depression of the brake pedal 20 and the clutch may be disengaged by operation of the clutch pedal 18 in the well known manner without bringing into action the improved braking mechanism. When desired, however, the brakes may be applied by the vacuum actuated apparatus simply by pushing down on the clutch pedal further than is required for the normal operation of the clutch. To accomplish this the clutch pedal 18 is depressed until the contact member 98 abuts the spring loaded plunger mechanism 83 or 94 as the case may be mounted on the chassis frame. When this contact is made the operator will feel the resistance of the spring or springs employed in this mechanism and be advised that the clutch is fully disengaged. During this initial movement of the clutch pedal the cam link 52 will have been engaged by the roller 50 mounted upon the clutch lever 18 and the rod 54 will be moved longitudinally in the direction of the arrow shown in the drawings thus throwing the valve lever 48 forwardly thus opening the valve initiating the rapid bleeding of fluid from the cylinder to cause the brake linkage to be adjusted in clearance take up position. Inasmuch as the diaphragm chamber 64 is open to atmospheric pressure during this initial movement of the rod longitudinally, the diaphragm 56 will remain stationary with respect to the casing 58 until the valve has been opened sufficiently to create a reduction of pressure in the cylinder 22 and also the chamber 64. The spring 72 being of sufficient strength to transmit the initial movement of the rod 54 to the lever 48, the diaphragm chamber 58 will be moved forwardly to a predetermined position dependent upon the setting of the spring loaded stop plunger 83 or 94. At this point the vacuum valve will have become partially opened due to the throw of the lever 48 and the piston 23 within the cylinder 22 will have undergone an initial and rapid movement which is just sufficient to accommodate the clearance take-up of the brakes 15. Inasmuch as the valve, controlled by the lever 48, is partly opened, the reduced pressure in the cylinder 22 will be bled through the valve 76 causing the diaphragm 56 to be drawn forwardly against the front portion of the casing 58. Such movement causes the spring 72 to be compressed until the diaphragm bears against the forward end of the casing 58. When the reduced pressure of the intake manifold is initially connected to the cylinder 22 by the valve operated by the lever 48, the rate of building up of vacuum acting on the piston 23 is somewhat retarded since the chamber 64 must also be evacuated in addition to the cylinder 22. During this initial relatively low vacuum period the slack in the brake system will be taken up by the movement of the piston 23. After the chamber 64 has been evacuated sufficiently to cause the diaphragm 56 to move into position abutting the casing 58, the maximum vacuum may be created in the cylinder 22 for the particular position of the lever 48. Also after the lever 52 has been moved to a position to operate the valve operated by the lever 48, the relative movement of the members 56 and 58 due to the vacuum will move this valve toward its closed position but will not completely close the valve as the lever 52 is initially moved far enough so that the return movement of lever 48 will not close the control valve operated by lever 48. This valve will then be in position to maintain the proper degree of vacuum in the cylinder to hold the brake mechanism in position with the slack taken up. As the valve controlled by the lever 48 is of the self lapping type it will maintain the desired degree of vacuum in the cylinder 22 to hold the brake linkage in slack take up position until the lever 48 is given further movement to open the valve to cause an increase in the degree of vacuum in the cylinder. Any additional depression of the clutch lever 18 accompanied by a further forward movement of the rod 54 will impart further movement to the lever 48 in a forward direction, the diaphragm 56 and its casing 58 moving in unison. Thus the vacuum valve operated by the lever 48 will be gradually opened and the piston further retracted so that the brakes will be applied an amount commensurate with the further depression of the clutch pedal. Upon removing the pressure on the clutch pedal 18 the rod 54 will be moved rearwardly by the spring 53 carrying with it the diaphragm 56 and the casing 58. When sufficient pressure has been relieved on the rod 54 the spring 72 then forces the diaphragm 56 away from the front wall of the casing 54 and against the rear wall of the same.

The throttle valve 76 in the conduit 74 (which varies the pressure drop in this conduit across the valve) may be adjusted to effectively vary the response to the application of pressure on the clutch pedal. Closing down this throttle valve will cause a more rapid take up by the piston of the brake clearance. Similarly opening of this valve 76 will cause a less rapid take up of the brake mechanism.

The invention is not to be limited to the exact arrangement of parts shown in the accompanying three sheets of drawings or described in this specification as various changes in details in the construction thereof may be resorted to without departing from the spirit of the invention. Only in so far as the invention has particularly been pointed out in the accompanying claims is the same to be limited.

We claim:

1. In an apparatus of the class described, a cylinder, a piston in said cylinder, a conduit communicating with the interior of said cylinder and communicating with a source of low fluid pressure means for controlling communication between said conduit and the cylinder, said means including a movable diaphragm chamber having a diaphragm therein, an actuating rod connected to said diaphragm, and a conduit leading from the interior of the diaphragm chamber to the interior of said cylinder.

2. In an apparatus of the class described, a cylinder, a piston in said cylinder, a conduit communicating with the interior of said cylinder and communicating with a source of low fluid pressure, means for controlling communication between said conduit and the cylinder, said means including a movable diaphragm chamber having a diaphragm therein, an actuating rod connected to said diaphragm, a conduit leading from the interior of the diaphragm chamber to the interior of said cylinder, and means for varying the flow of fluid through said last named conduit.

3. The combination with a cylinder having a piston therein of a conduit communicating with the interior of said cylinder and with a source of actuating pressure for causing actuation of said piston, a valve for controlling the flow of actuating fluid through said conduit, a lever for operating said valve, a diaphragm chamber connected to said lever and having a diaphragm disposed therein, an actuating rod connected to said diaphragm, and a conduit communicating with the interior of said cylinder and with the interior of said diaphragm chamber.

4. The combination with a cylinder having a piston therein of a conduit communicating with the interior of said cylinder and with a source of actuating pressure for causing actuation of said piston, a valve for controlling the flow of actuating fluid through said conduit, a lever for operating said valve, a diaphragm chamber connected to said lever and having a diaphragm disposed therein, an actuating rod connected to said diaphragm, a conduit communicating with the interior of said cylinder and with the interior of said diaphragm chamber, and means for regulating the flow of fluid through said last mentioned conduit.

5. The combination with a valve actuating lever for controlling the flow of actuating fluid to the interior of a cylinder, of a diaphragm chamber connected to said lever, said chamber having a diaphragm therein, an actuating rod connected to said diaphragm and extending externally of the chamber, means associated with said actuating rod for normally urging the rod and diaphragm in one direction and for urging the diaphragm chamber in the opposite direction and a conduit connecting the interior of said diaphragm chamber and the cylinder, said conduit entering said chamber on the opposite side of said diaphragm from said actuating rod.

6. The combination with a valve actuating lever for controlling the flow of actuating fluid to the interior of a cylinder, of a diaphragm chamber connected to said lever, said chamber having a diaphragm therein, an actuating rod connected to said diaphragm and extending externally of the chamber, means associated with said actuating rod for normally urging the rod and diaphragm in one direction and for urging the diaphragm chamber in the opposite direction, a conduit connecting the interior of said diaphragm chamber and the cylinder, said conduit entering said chamber on the side opposite the actuating rod, and a throttle valve in said conduit.

7. The combination with a cylinder and a valve actuating lever for controlling the passage of actuating fluid to and from the cylinder, of a diaphragm chamber connected to said lever, a diaphragm disposed in said chamber, an actuating rod connected to said diaphragm and extending externally of the chamber, means for normally urging the diaphragm chamber and actuating rod in opposite directions and a conduit connecting the interior of said diaphragm chamber with the interior of said cylinder.

8. The combination in an automotive vehicle having a clutch and a brake, of fluid pressure actuated means for applying the brake, a valve for controlling the application of the brake and means for operating said valve whereby the brake clearance is taken up upon initial movement of said valve and the brake connections remain in clearance take-up position until said valve is given further movement, said valve operating means including a valve actuating lever, an actuating rod adapted to operate said lever and fluid pressure actuated means interposed between said rod and lever and adapted to vary the effective length of said rod.

9. In combination in an automotive vehicle, a fluid pressure actuated brake, a clutch, a valve for controlling the application of said fluid pressure actuated brake, means, operable upon movement of said clutch in clutch disengaging direction, for giving said valve an initial opening movement and means for automatically moving said valve in closing direction after said initial opening movement.

10. In combination in an automotive vehicle, a fluid pressure actuated brake, a clutch, a clutch operating pedal, a valve for controlling the application of said fluid pressure actuated brake, operating connections between said valve and said clutch pedal, and means, responsive to movement of said valve, for changing the effective length of said operating connections.

11. In combination in an automotive vehicle, a fluid pressure actuated brake, a valve for controlling the application of said brake, a pedal, operating connections between said valve and said pedal whereby movement of said pedal operates said valve and means, operative upon movement of said valve in brake applying direction, for changing the effective length of said operating connections.

12. The combination in an automotive vehicle having a brake and operating connections therefor, of fluid pressure actuated means for applying the brake, a valve for controlling the application of the brake and means for operating said valve whereby the brake clearance is taken up upon initial movement of said valve in brake applying direction and the brake connections remain in clearance take-up position until said valve is given further movement, said valve operating means including a valve actuating lever, an actuating rod adapted to operate said lever and fluid pressure actuated means interposed between said rod and lever and adapted to vary the effective length of said rod.

13. The combination in an automotive vehicle having a brake and operating connections therefor, of fluid pressure actuated means for applying the brake, a valve for controlling the application of the brake, means for operating said valve whereby the brake clearance is taken up upon initial movement of said valve from its off position in brake applying direction and the brake connections remain in clearance take-up position until said valve is given further movement, and means for imposing aditional resistance to movement of said valve operating means during such further movement.

14. In an automotive vehicle the combination of a brake, fluid pressure actuated means for operating said brake, and control mechanism for said fluid pressure actuated means, said control mechanism including an operating lever and means effective upon the initial movement of said lever in brake applying direction for controlling the operation of said fluid pressure actuated means whereby the brake clearance is taken up and the brake is maintained in clearance take-up position until said lever is given further movement, said means for controlling the operation of the fluid pressure actuated means for operating the brake including a control valve, a valve actuating lever, an actuating rod adapted to operate said lever and fluid pressure actuated means interposed between said rod and lever and adapted to vary the effective length of said rod.

15. In an automotive vehicle the combination of a brake, fluid pressure actuated means for operating said brake, a source of actuating fluid pressure, a conduit adapted to connect said fluid pressure actuated means and said source of actuating pressure, and means for controlling said brake operating means including valve means for controlling the flow of actuating fluid to and from said brake operating means, operating connections for said valve, and a diaphragm housing having a diaphragm therein, said housing and diaphragm being inserted in and forming a part of said operating connections and adapted to vary the effective length of said connections.

16. In an automotive vehicle the combination of a brake, fluid pressure actuated means for operating said brake, a source of actuating fluid pressure, a conduit adapted to connect said fluid pressure actuated means and said source of actuating pressure, and means for controlling said brake operating means including valve means for controlling the flow of actuating fluid to and from said brake operating means, operating connections for said valve, a diaphragm housing having a diaphragm therein inserted in said operating connections and adapted to vary the effective length of said connections, and fluid pressure conducting connections between said diaphragm housing and said fluid pressure actuated brake operating means whereby the effective length of said valve operating connections will be varied upon the initial opening of said control valve.

17. In combination in an automotive vehicle, a fluid pressure actuated brake, a clutch, a valve for controlling the application of said fluid pressure actuated brake, operating connections between said clutch and said valve including a resilient member and fluid pressure actuated means for compressing said resilient member when said valve is intitially opened whereby the effective length of said operating connections may be changed.

18. In an automotive vehicle, the combination of a brake, fluid pressure actuated means for operating said brake, control mechanism for said fluid pressure actuated means, said control mechanism including an operating lever, operating connections between said lever and said valve including a resilient member and fluid pressure actuated means for compressing said resilient member when said valve is initially opened whereby the effective length of said operating connections may be changed.

FREDERICK G. FOLBERTH.
WILLIAM M. FOLBERTH.